United States Patent [19]

Luska

[11] Patent Number: 4,552,165

[45] Date of Patent: Nov. 12, 1985

[54] METHOD AND DEVICE FOR MAINTAINING DENSITY OF A PRINTED COLOR CONSTANT

[75] Inventor: Zdenek Luska, Apples, Switzerland

[73] Assignee: Bobst SA, Lausanne, Switzerland

[21] Appl. No.: 622,673

[22] Filed: Jun. 20, 1984

[30] Foreign Application Priority Data

Jun. 21, 1983 [CH] Switzerland ................. 3387/83

[51] Int. Cl.$^4$ .................................... B41F 31/00
[52] U.S. Cl. ................................... 137/3; 137/92; 137/93
[58] Field of Search ............... 137/3, 93, 92; 356/402, 356/425; 101/DIG. 24

[56] References Cited

U.S. PATENT DOCUMENTS

| 2,978,951 | 4/1961 | Christie | 137/93 X |
| 3,299,787 | 1/1967 | Kolb | 137/93 X |
| 4,256,131 | 3/1981 | De Remigis | 137/93 X |

*Primary Examiner*—Alan Cohan

*Attorney, Agent, or Firm*—Hill, Van Santen, Steadman & Simpson

[57] ABSTRACT

In a system for maintaining density of a printed color constant, a reading unit is connected with a unit measuring the reading signal. An amplitude measuring unit and a rated variable voltage source are connected with a comparator. The comparator is connected with a PID regulator, the signal of which is connected with a first adder which itself connects with a viscosity code setting potentiometer. The first adder is connected with a second adder connected to a viscosimeter. The signal produced by the second adder is sent to an amplifier connected with a command circuit for controlling mixer valves for ink and solvent. This command circuit can be locked or released by means of signals received from a level indicator in a tank. The command circuit also actuates a pump and a valve of a return circuit of the ink/solvent mixture. The system is employed for controlling and keeping constant color density of a print.

8 Claims, 4 Drawing Figures

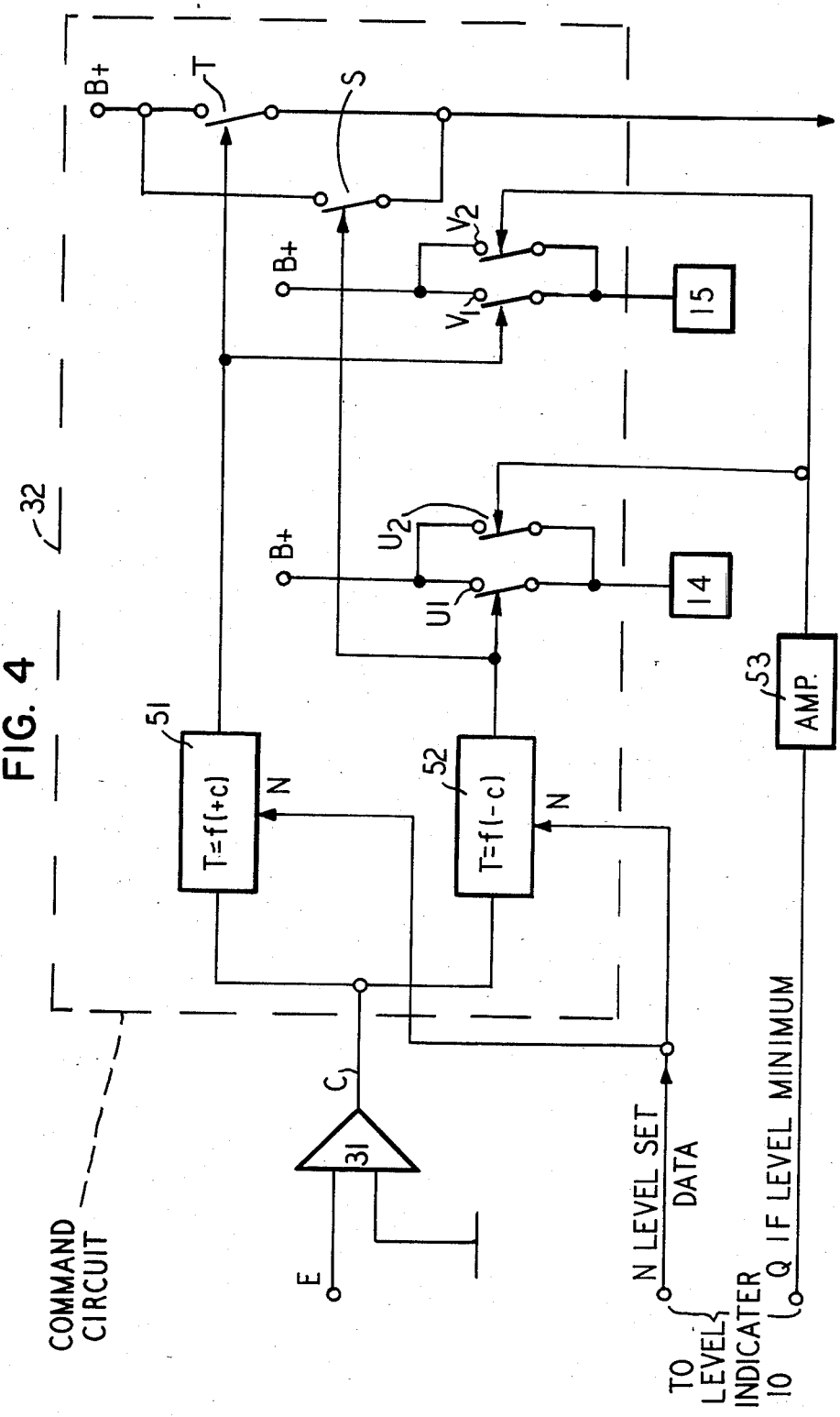

METHOD AND DEVICE FOR MAINTAINING DENSITY OF A PRINTED COLOR CONSTANT

BACKGROUND OF THE INVENTION

The present invention refers to a method and a device for keeping constant the density of a printed color, such as with an offset press.

Regular intensity and density of printed colors is very important if good printing quality is to be insured, and various solutions have been proposed. Previously known devices check viscosity of the printing colors being used. If these colors do not satisfy the required viscosity for the printing quality desired, the printer modifies the proportions in the ink/solvent mixture to change the viscosity. This is done by means of a mixer, the valves of which are governed by a signal responsive to the displayed viscosity measured by means of a standard viscosimeter. However, between the moment the printing quality starts degrading and the moment the printer acknowledges the flaw, a large quantity of material to be printed goes on running through the machine. This poorly printed material represents, of course, an important loss.

The known devices calculate the requested viscosity value. The viscosimeter is then manually set to keep this value by valves bringing to the mixer the ink, on the one hand, and the solvent on the other hand. Thus the constant viscosity of the ink/solvent mixture is maintained during the whole printing operation. The viscosity of this mixture can vary for different reasons, such as by solvent evaporation, changes of temperature, ink or solvent absorption by the material to be printed, etc. When the printer notices an inadequate color density, he will manually increase or lower the viscosity of the ink/solvent mixture. It should also be noted that the thixotropic or rheotropic characteristics of the ink/solvent mixture influence the viscosity.

Although the known devices act on the viscosity of the ink/solvent mixture, they do not automatically register the results on the printed material, and they require a manual setting during the running of the machine. The main drawback of this is the impossibility to detect and immediately correct a density variation of a printed color. The "newspaper" printing machines, for instance, with very high running speeds reaching sometimes 700–800 m/min, undergo losses of the color density changes. This is not acceptable for other printing jobs.

SUMMARY OF THE INVENTION

According to the invention, the density of a printed color on a medium is kept constant by receiving light rays reflected by a printed mark on the medium and transmitting the reflected light rays to a photodiode to generate a signal corresponding to their intensity. An amplitude of the signals is measured and compared with the reference value to provide a correction signal. The correction signal is combined with a viscosity code signal indicating a viscosity code of an ink/solvent mixture used for printing on the medium in order to generate a corrected viscosity code signal. The corrected viscosity code signal is combined with a viscosity measure signal in order to produce an error signal. The error signal is used to command opening or closing of valves of a mixer for regulating the ink/solvent mixture.

According to a further feature of the invention, a level of the ink/solvent mixture in the tank is controlled.

BRIEF DESCRIPTION OF THE DRAWINGS

FIG. 4 is a schematic diagram of the command circuit 32 shown in the system of FIG. 1.

DESCRIPTION OF THE PREFERRED EMBODIMENTS

Figure 1:
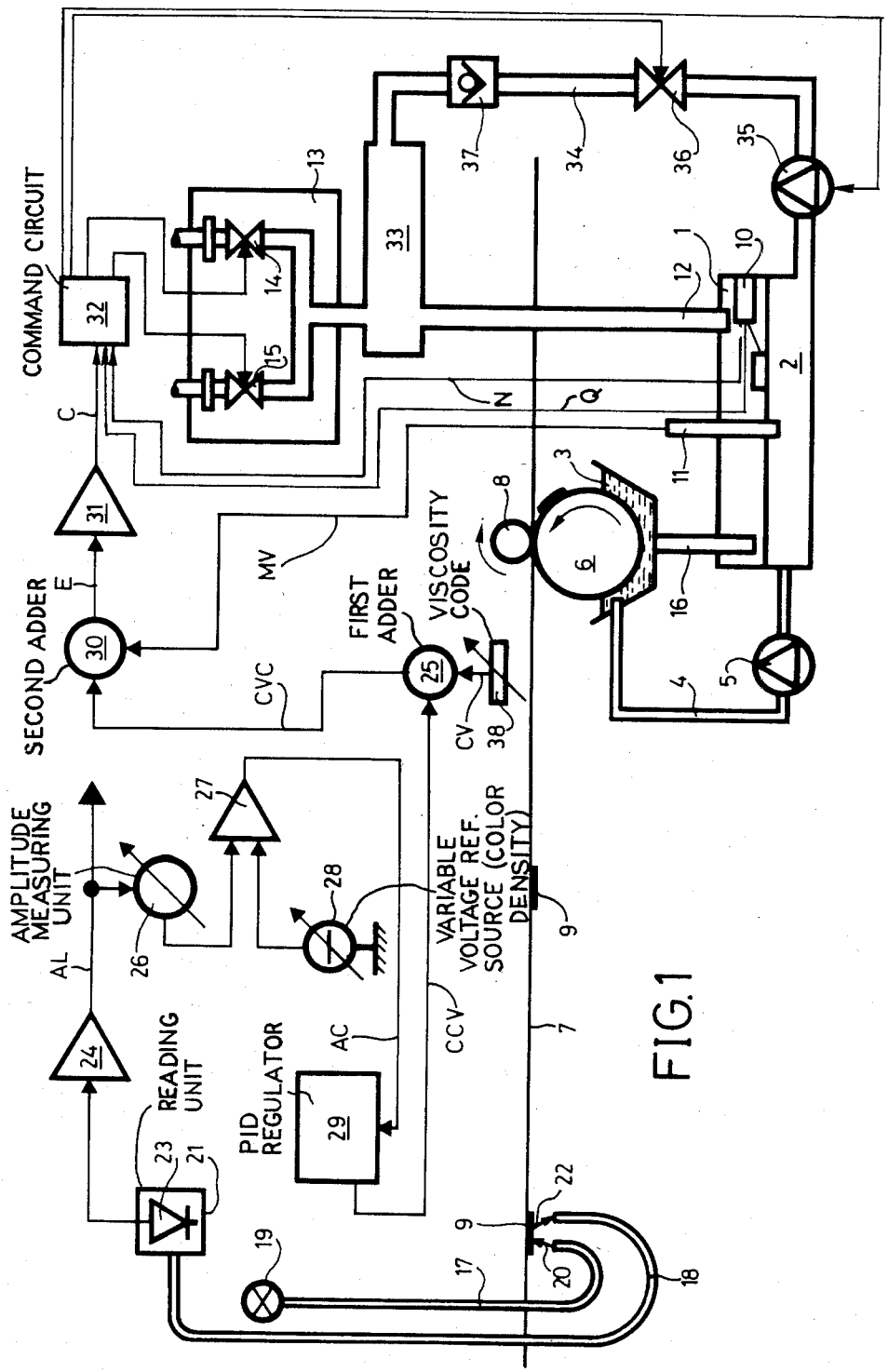
FIG. 1 schematically shows the device according to the invention.

The device of FIG. 1 is used with a tank 1 containing an ink/solvent mixture 2. The tank 1 is connected with an ink pot 3 by a pipe 4 provided with a pump 5 which brings to the ink pot 3 the ink/solvent mixture to be transferred onto the engraved cylinder 6. This engraved cylinder 6 reproduces its print, as well as a mark 9 on a web material 7 with the help of a pressure roller 8. The tank 1 is provided with a level indicator 10 and a viscosimeter 11. The ink/solvent mixture 2 is brought to the tank 1 by a channel 12 coming out of a mixer 13 made of two valves 14 and 15. The valve 14 checks the ink flow, whereas the valve 15 controls the solvent flow. The return of the ink/solvent mixture 2 from the inkpot 3 into the tank 1 occurs by gravity through the pipe 16.

The detecting unit of the device is comprised of two optic fibers 17 and 18 reading the mark 9. The optic fiber 17 is connected with a light ray source 19 and produces an incident ray 20 towards the web material 7. The optic fiber 18 is connected with a reading unit 21 and catches a reflected ray 22. The reading unit 21 is comprises of a diode 23 transmitting the received signals to a gain amplifier 24. The amplifier 24 produces a signal which is an amplified value AL of the reading unit signal. It can be used for driving a known device for controlling the lingitudinal color registering. Here, the signal is transferred to an amplitude measuring unit 26 connected with a comparator 27 which also receives a signal from a variable voltage reference source 28. The comparator 27 produces a compared amplitude signal AC, which is transmitted to a PID (Proportional Integration Derivation) regulator 29 producing a correction signal CCV. This signal CCV is then sent to a first adder 25 also receiving a signal which is the viscosity code CV previously calculated for the job to be printed. This CV signal is set by a potentiometer 38. The signal produced by the adder 25 is a corrected viscosity code signal CVC. This CVC signal is sent to a second adder 30 where it is combined with a viscosity measuring signal MV given by the viscosimeter 11. The data received from the adder 30 is an error code E sent to an amplifier 31 processing it and sending a command signal C to a command circuit 32 acting on the valves 14 and 15 of the mixer 13. The command circuit 32 also receives data N from the level indicator 10. These data N act on the command circuit 32 so that the viscosity of the ink/solvent mixture 2 is maintained unchanged when the level of the mixture in the tank 1 is not at its maximum. The data N acts therefore as a temporary locking signal for the command circuit 32, and as an antioverflow signal for the tank 1. In order to warrant the continuous operation of the device at a given mixture level in the tank 1, a mixture 2 return circuit with an accumulation container 33 connected with the tank 1 by a pipe 34 provided with a pump 35, a valve 36, and a non-return valve 37 can be used. The pump 35 and the non-return valve 37 are operated simultaneously by a command circuit 32 signal. This signal is also sent when the ink/solvent mixture flows into the channel 12 and the operating flow of the pump 35 is calculated with respect to the flow in the channel 12 by means of a controlling device not shown.

The device is operated as described hereafter. The variable source 28 is set manually at a value previously calculated with respect to the desired color density. Then the potentiometer 38 is actuated manually so that it produces a CV signal defining the viscosity corresponding to the ink/solvent mixture used. Then the machine is started and the web material 7 runs in front of optic fibers 17 and 18. The light source 19 sends through the optic fiber 17 a light ray 20 towards the web material 7. The reflected ray 22 is received by the optic fiber 18. Thus the diode 23 produces a signal while the web runs. This signal changes with respect to the prints running in front of the optic fibers 17 and 18, particularly when the color or the color density change. The optic fibers 17 and 18 are then positioned in front of the marks 9 and as the variable light source 28 is set with respect to a desired color density, the change of amplitude of the signal transmitted by the diode 23 will produce a compared amplitude signal AC generated by the comparator 27. The signal AC is also used in the PID regulator. Its CCV output signal is compared with the viscosity code signal CV, and the result will be the CVC corrected viscosity code which is then itself compared with the viscosity measure signal MV in order to produce the error signal E acting on the valves 14 and 15 correcting the viscosity of the ink/solvent mixture and giving to the error signal E a 0 value. This certifies that the desired color density is achieved for the job being run.

Figure 2:
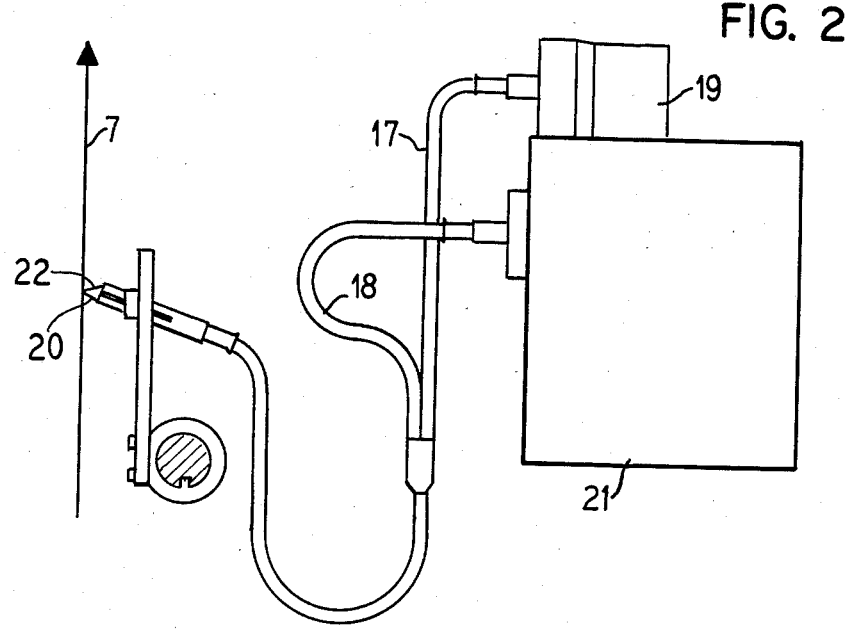
FIG. 2 illustrates a layout for the reflected light detecting system used in the system of FIG. 1.

FIG. 2 shows in somewhat greater detail the optic fibers 17 and 18, light source 19, instant ray 20, and reflected ray 22, with respect to web 7.

Figure 3:
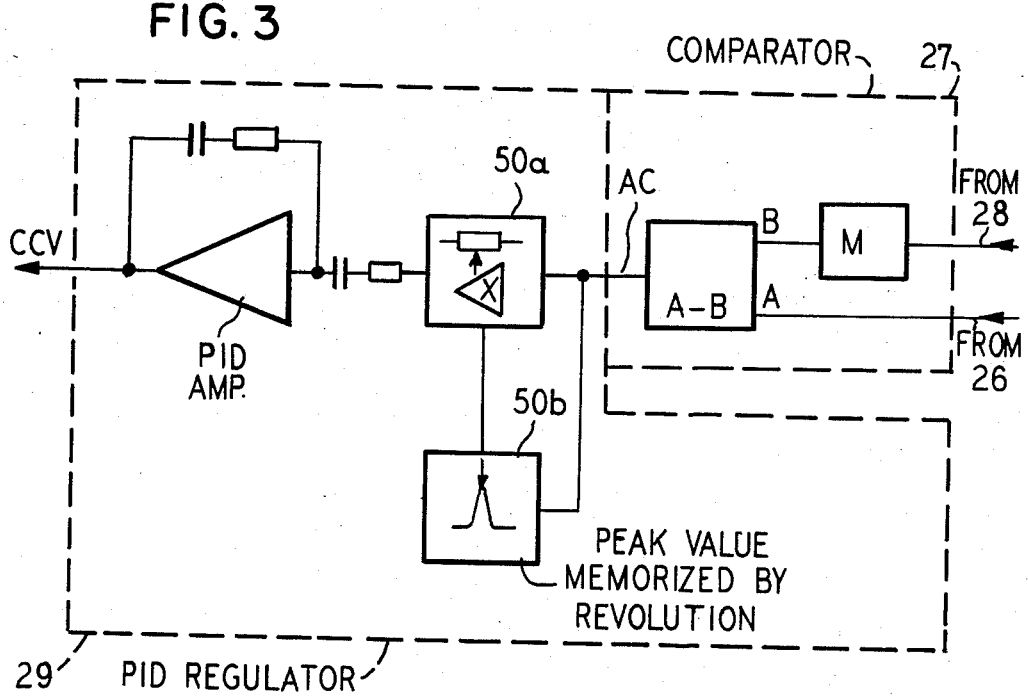
FIG. 3 is a schematic diagram of the PID regulator 29 shown in FIG. 1.

FIG. 3 shows construction of the PID regulator 29 and comparator 27 shown in FIG. 2. From the variable voltage reference source 28 a signal is fed through intermediate stage M to input B of an A-B comparator. Input A receives signals from amplitude measuring unit 26. Signal AC is fed through peak value units 50A, 50B to PID amp (Proportional Integration Derivation amp) to create the correction signal CCV.

As shown in FIG. 4, the command circuit 32 receives a signal C which are fed to timing units 51 and 52. Timing unit 51 provides an activating signal for switches T and V1 for a period of time which is a function of the positive magnitude of signal C. Similarly, timing circuit 52 provides an enabling signal for activating switch U1 and switch S for a period of time which is a function of the negative going magnitude of signal C. Thus, valve 14 supplying ink is activated in accordance with a signal −C indicating insufficient ink. Similarly, solvent valve 15 is activated in the event of a signal +C indicating insufficient solvent. Switches T and S activate the pump 35 and valve 36 which provides for circulation during mixing. The recirculating circuit insures a good mixing operation and allows time to reach the right viscosity of the mixture when correction occurs.

As described previously, the automatic level control system is activated when the level indicator 10 provides a signal Q through amplifier 53 if the level is minimum in order to add solvent and ink by activating switches U2 and V2. A signal N is also received from the level indicator 10 which temporarily disengages the timing circuits 51 and 52. When disengaged, timing units 51 and 52 can then set the appropriate mixture levels for solvent and ink.

The main advantage of the device of the invention is that the color density correction occurs as soon as the color density of the mark 9 changes, and the loss caused by an inadequate print is reduced as much as possible. The device also has the advantage of allowing the use of a read unit 21 which may also act as a register control for web registration longitudinally or laterally.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for keeping constant density of a printed color on a medium, comprising the steps of:
    receiving light rays reflected by a printed mark on the medium;
    transmitting the reflected light rays to a photodiode to generate a signal corresponding to their intensity and thus representative of the density of the printed color;
    measuring an amplitude of the signals and comparing a resulting measured value with a reference value to provide a correction signal;
    combining the correction signal with a viscosity code signal indicating a viscosity code of an ink/solvent mixture used for printing on the medium in order to generate a corrected viscosity code signal;
    combining the corrected viscosity code signal with a viscosity measuring signal derived from viscosity measurement of the ink/solvent mixture in order to provide an error signal; and
    using the error signal to command opening or closing of valve means of a mixture for regulating the ink-/solvent mixture.

2. A method according to claim 1 including the step of activating a mixture return circuit which mixes by circulation the ink/solvent mixture.

3. A method according to claim 2 wherein the mixture return circuit is activated during error signal command regulating the ink/solvent mixture.

4. A method according to claim 1 including the step of automatically maintaining a level of the ink/solvent mixture in the tank.

5. A method according to claim 4 including the step of providing a mixture level indicator having a signal output for selectively preventing the valve means from regulating the ink/solvent mixture when ink/solvent mixture is being added to restore the mixture to a given level.

6. A system for keeping constant density of a printed color on a medium, comprising:
    means for receiving light rays reflected by a printed mark on the medium;
    means for transmitting the reflected light rays to a photodiode to generate a signal corresponding to their intensity and thus representative of the density of the printed color;
    means for measuring an amplitude of the signals and comparing a resulting measured value with a reference value to provide a correction signal;

means for combining the correction signal with a viscosity code signal indicating a viscosity code of an ink/solvent mixture used for printing on the medium in order to generate a corrected viscosity code signal;

means for combining the corrected viscosity code signal with a viscosity measuring signal derived from viscosity measurement of the ink/solvent mixture in order to provide an error signal; and means for using the error signal to command opening or closing of valve means of a mixture for regulating the ink/solvent mixture.

7. A system according to claim 6 wherein a light detector has its signal output connected with a gain amplifier whose output connects to an amplitude measuring unit;

a comparator having its first input connected to an output of the amplitude measuring unit and a second input connected to a variable voltage reference source means for setting color density;

an output of the comparator connecting to a first input of a first adder and whose second input is connected to a potentiometer on which the viscosity code is set;

a second adder having its first input connected to an output of the first adder and its second input connected to a viscosimeter;

an output of the second adder connecting to a command circuit connected to an ink valve and a solvent valve of a mixer unit;

a return mixture circuit comprising a valve means for circulating the mixture;

a level indicator means for indicating a level of mixture in a tank holding the mixture; and the level indicator means having an output connected with the command circuit.

8. A system according to claim 7 wherein the return circuit of the ink/solvent mixture comprises an accummulation container, a pump, said valve means, and a non-return valve, all connected in series with each other and with the tank by a pipe.

* * * * *